Patented Dec. 15, 1931

1,836,267

UNITED STATES PATENT OFFICE

REX DE ORE McDILL, OF RIVERSIDE, CALIFORNIA, ASSIGNOR TO FOOD MACHINERY CORPORATION, OF SAN JOSE, CALIFORNIA, A CORPORATION OF DELAWARE

PROCESS OF TREATING FRUIT TO PRESERVE THE SAME IN TRANSIT TO MARKET

No Drawing.      Application filed January 11, 1930. Serial No. 420,292.

This invention relates to a process of covering fruit with a coating for the purpose of retarding shrinkage of the fruit in transit to the market and a process of preventing decay of fruit.

Heretofore, fruit, such as citrus fruit, has been coated with various waxes or wax-like covering material for the purpose of retarding the shrinkage of the fruit when it is passing to the market. These coverings of the fruit have been applied both with and without a treatment of the fruit with a material for preserving or disinfecting the fruit against mold decay. Among the materials employed have been solid paraffin waxes. Solid paraffin wax is difficult to apply uniformly to the fruit with the desired thinness of coating unless there is used a volatile solvent to the fruit or unless the coating is heated.

Moreover, difficulty is experienced in preventing application of too heavy a coating which has the effect of completely smothering the fruit, inducing souring of the fruit or anaerobic fermentation.

Fruit covered with solid paraffin petroleum wax further has a tendency for the wax to crack and peel, spoiling the appearance of the fruit at the market.

It has also been suggested to use heavy mineral oils refined until they are water-white and free of all coloring and unsaturated bodies as a coating material either with or without the addition of paraffin wax. The purpose of the use of oil is to obtain a material which is more readily applied to the fruit and which can be applied in a thinner covering and which has less tendency as a coating to crack and injure the appearance of the fruit. Oil alone is not sufficiently solid or viscous to satisfactorily cover fruit and it is generally found advisable to employ paraffin therewith. In practice it is found, however, that paraffin tends with changes of temperature, to crystallize from the oil and a completely satisfactory covering is not attained.

Furthermore, when wax or oil coverings are applied to citrus fruit in conjunction with the treatment of the citrus fruit with the material designed for liberating chlorine as an agent for retarding the development of mold, the wax or oil has the effect of immediately upon its application to prevent any further effect of the chlorine liberating material. Mineral oil and paraffin wax with chlorine immediately form a chlorinated paraffin compound, thus preventing any effective action of the chlorine upon mold spores which may be present.

It is the general object of the present invention to provide a process of treating fruit by which fruit may have applied thereto a covering of the desired consistency which will remain with the fruit during marketing of the fruit and yet is free of any tendency towards crystallization or separation from the fruit, and which wll not leave a noticeable deposit upon the fruit.

It is a further object of the present invention to provide a process of treating fruit by which a covering of the desired thickness may be attained without the necessity of employing either heat or volatile solvents.

It is a further object of the present invention to provide a process of treating fruit which will produce a covering to the fruit which is saturated, in so far as its tendency towards absorption of chlorine is concerned, so that the covering material will not have the effect of interfering with action of chlorine liberating agents in inhibiting the growth of molds on the fruit.

This invention comprehends that when petroleum wax or paraffin wax is treated with chlorine, a chlorinated paraffin compound is produced which compound has a consistency somewhat between that of oil and solid possessing a melting point around about 100° F. The compound may contain some hydrocarbons which have not been completely chlorinated but in any case the substance itself has a uniform consistency and is entirely homogeneous both during its application and throughout its use upon citrus fruit. Chlorinated hydrocarbon or chlorinated wax is very readily applied to citrus fruits by brushes or other rubbing means and may be applied to the citrus fruit both when the citrus fruit is dry and when the citrus fruit is wet either with water or solutions of mold inhibiting agents. When applied to citrus fruit it forms a very fine film upon the citrus fruit and is adequate and effective in preventing shrinkage without however smothering the fruit or producing anaerobic decay. It also permits the citrus fruit to be very highly polished and exhibiting an attractive appearance to the fruit.

The process will be most readily understood from a description of the preferred form or example of a process embodying the invention. For this purpose I have hereafter described a preferred form or example of a process embodying the present invention.

In the preferred process I take citrus fruit such as is obtained from the grove and wash the fruit in any desired manner, with or without the use of soap, washing powders, or alkalis and with or without the simultaneous application of a mold inhibiting agent. The citrus fruit may then be introduced into a main treating tank wherein it is subjected to the action of an aqueous solution of a mold inhibiting agent either heated or cooled, depending upon whether the inhibiting agent requires a hot or cold solution. For example, I may use a solution of sodium hypochlorite containing the usual bicarbonate for stabilizing the same, in which case the solution is cold when the fruit is treated. After the application of the solution of the mold inhibiting agent, the fruit is then preferably sprinkled with water for removing the solution in order that it will not disintegrate the brushes which apply the coating composition. In other cases, however, it may be desired to leave the solution on the fruit so that it in part will remain with the fruit during marketing of the fruit. In any case, the fruit wet either with the rinsing water or with the solution of the mold inhibiting agent, is then passed on to brushes whereat the chlorinated hydrocarbons or waxes are applied to the fruit to form a coating for retarding shrinkage.

As an example of a suitable chlorinated hydrocarbon or wax for use with the present invention, I have taken paraffin wax such as has a melting point of 145° F., and passed chlorine through the same until a product of the desired melting point or consistency is attained. In the treatment the wax is heated preferably between 120° and 140° C. to speed up the absorption of the chlorine. To secure complete chlorination, the weight of the wax must be increased about 40 to 50% and complete chlorination will produce a product about the consistency of a very heavy oil.

The completely chlorinated wax is known as "chlorcosane." When less than complete chlorination is used the resulting material is a solution of paraffin wax and chlorcosane.

I prefer, however, to utilize only a partially chlorinated product, for example, using a material which is produced by passing chlorine through the wax until the weight has increased only 25%. The process may be varied to produce various consistencies of the covering material as desired, and I prefer for example, to use a product containing less chlorine and harder in the summer-time than I employ in the winter-time. It is a marked advantage of the process of the present invention of the ease with which the melting point and consistency of the covering may be varied as the requirements of the different seasons make desirable.

The chlorinated paraffin or wax is spread uniformly over the fruit by brushes of any usual or desired type. The chlorinated hydrocarbons may be fed to the brushes in any desired way, for example, they may be squeezed onto the brushes from some pressure feeding device or the brushes may be caused to pass through a supply of the chlorinated hydrocarbons on one side and apply the material to the fruit on the other, or the chlorinated hydrocarbons may be sprayed on the brushes or fruit.

As a final operation, the brushing of the fruit in the presence of the chlorinated waxing material is continued until a polished fruit is attained. This operation may or may not take place simultaneously with the application of heat for drying the fruit.

The process of the present invention produces a fruit coated so as to retard shrinkage in transit and the coating may be of any desired consistency and is entirely homogeneous. During the use of the coating there is no tendency of the different constituents to settle or for the coating to crystallize and appear white on the fruit or to peel from the fruit.

While the particular process herein described is well adapted for carrying out the objects of the present invention, it is to be understood that various modifications and changes may be made all without departing from the principles of the invention, and this invention includes all such modifications and changes as come within the scope of the appended claims.

I claim:

1. A process of treating fruit for preventing shrinkage in transit to the market which consists in covering said fruit with chlorinated waxes.

2. A process of treating fruit for preventing shrinkage of the fruit in transit to the market which consists in covering the fruit with a thin film of a homogeneous solution of paraffin wax and chlorcosane.

3. A process of treating fruit to prevent shrinkage of fruit in transit to the market which consists in passing the fruit over brushes and simultaneously applying chlorinated waxes, whereby the chlorinated waxes are rubbed and brushed over the fruit to form a continuous covering film.

4. A process of treating fruit to retard shrinkage of the fruit in transit to the market which consists in applying a solution of paraffin and chlorcosane to the exterior of the fruit, and brushing the fruit to form the mixture into a thin covering film over the fruit.

5. A process for treating fruit to retard shrinkage of the fruit in transit to the market which comprises, applying a film of a chlorinated wax to the exterior of the fruit while the fruit is wet.

6. A process of treating fruit to retard shrinkage of the fruit in transit to the market which comprises, brushing chlorinated hydrocarbons over the fruit while the fruit is wet.

7. A process of treating fruit to retard shrinkage of the fruit in transit to the market which comprises, applying a film coating including chlorcosane to the exterior of the fruit by rubbing the fruit, while wet, with a coating material including chlorcosane.

8. A process of treating fruit for preserving the fruit in transit to the market which comprises, applying a solution of a mold inhibiting agent to the fruit and then while the fruit is still wet with said solution applying a film of a coating material including chlorcosane to the fruit.

9. A process of preserving fruit in transit to market which comprises, treating the fruit with a mold inhibiting solution and chlorine liberating agent, and thereafter covering the fruit with a shrinkage retarding coating including chlorcosane.

10. A process of preserving fruit in transit to the market which comprises, treating the fruit with a solution of a mold inhibiting agent, liberating chlorine, and then while the fruit is still wet with said solution covering the fruit with a shrinkage retarding film of a coating material including chlorcosane.

Signed at Los Angeles, California, this 7th day of January, 1930.

REX DE ORE McDILL.